US009743075B2

(12) United States Patent
Kwak et al.

(10) Patent No.: US 9,743,075 B2
(45) Date of Patent: Aug. 22, 2017

(54) IMAGE DISPLAY METHOD AND APPARATUS

(71) Applicant: LG ELECTRONICS INC., Seoul (KR)

(72) Inventors: Kook Yeon Kwak, Seoul (KR); Kwan Suk Kim, Seoul (KR); Jong Yeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/873,531

(22) Filed: Oct. 2, 2015

(65) Prior Publication Data

US 2016/0029013 A1    Jan. 28, 2016

Related U.S. Application Data

(63) Continuation of application No. 13/578,128, filed as application No. PCT/KR2011/000880 on Feb. 10, 2011, now Pat. No. 9,179,138.

(60) Provisional application No. 61/305,905, filed on Feb. 18, 2010, provisional application No. 61/302,961, filed on Feb. 10, 2010.

(51) Int. Cl.
*H04N 13/00* (2006.01)
*H04N 13/04* (2006.01)
*G02B 27/22* (2006.01)

(52) U.S. Cl.
CPC ..... *H04N 13/0438* (2013.01); *G02B 27/2264* (2013.01); *H04N 13/0497* (2013.01); *H04N 2013/0461* (2013.01); *H04N 2013/0463* (2013.01)

(58) Field of Classification Search
CPC .......... H04N 13/0438; H04N 13/0003; H04N 13/0055; H04N 13/0239; G02B 27/2264
See application file for complete search history.

(56) References Cited

U.S. PATENT DOCUMENTS

| 6,188,442 | B1 * | 2/2001 | Narayanaswami | H04N 13/0048 345/7 |
| 6,313,866 | B1 * | 11/2001 | Akamatsu | G06F 3/011 348/51 |
| 6,597,328 | B1 | 7/2003 | Stern et al. | |
| 6,603,504 | B1 * | 8/2003 | Son | H04N 13/0404 348/54 |
| 8,237,779 | B2 * | 8/2012 | Marshall | H04N 13/0438 348/42 |

(Continued)

FOREIGN PATENT DOCUMENTS

| JP | 9-501332 A | 2/1997 |
| KR | 10-0667823 B1 | 1/2007 |

*Primary Examiner* — Frank Huang
(74) *Attorney, Agent, or Firm* — Dentons US LLP

(57) ABSTRACT

An image display apparatus according to an embodiment of the present invention comprises: an IR emitter controller for recognizing a pair of 3D glasses connected to the image display apparatus; a video multiplexer for receiving a plurality of displayed video data using a plurality of pairs of 3D glasses, setting a frame rate for the plurality of video data to assign a frame period thereto, and multiplexing the plurality video data according to the frame period assigned at the set frame rate, when the plurality of pairs of 3D glasses is connected to the image data apparatus; and a display unit for frame-sequentially displaying the multiplexed video data.

8 Claims, 7 Drawing Sheets

(56) References Cited

U.S. PATENT DOCUMENTS

| | | | |
|---|---|---|---|
| 8,908,019 B2 * | 12/2014 | Sato | H04N 13/00 348/56 |
| 2007/0123122 A1 | 5/2007 | Puzella et al. | |
| 2007/0229487 A1 | 10/2007 | Slavenburg et al. | 345/213 |
| 2009/0167845 A1 | 7/2009 | Khan | |
| 2009/0237495 A1 | 9/2009 | Kawahara | |
| 2010/0026794 A1 * | 2/2010 | Chang | H04N 13/0438 348/56 |
| 2010/0188488 A1 * | 7/2010 | Birnbaum | G09G 3/001 348/53 |
| 2010/0208042 A1 * | 8/2010 | Ikeda | G11B 20/1251 348/53 |
| 2010/0225751 A1 * | 9/2010 | Nemeth | H04N 13/0438 348/58 |
| 2010/0309535 A1 * | 12/2010 | Landowski | G02B 27/2264 359/107 |
| 2011/0122152 A1 * | 5/2011 | Glynn | G06F 21/84 345/629 |
| 2012/0268453 A1 * | 10/2012 | Hwang | H04N 13/0434 345/419 |

* cited by examiner

IMAGE DISPLAY METHOD AND APPARATUS

FIELD OF THE INVENTION

The present invention relates to an image display method and apparatus and, more particularly, to a method and apparatus for controlling image display, so that multiple users can be capable of viewing multiple images by using a 3D viewing environment.

BACKGROUND ART

Generally, a 3-dimensions (3D) image (or stereoscopic image) provides a cubic effect by using the principles of stereoscopic vision of both human eyes. A human being (or individual) senses perspective through a parallax between both eyes, in other words, a binocular parallax caused by the two eyes of an individual being spaced apart at a distance of approximately 65 millimeters (mm). Therefore, a 3D image may provide a cubic effect and perspective by providing an image enabling and a flat image associated with both the left eye and the right eye to be viewed.

Methods for displaying such 3D image include a stereoscopic method, a volumetric method, a holographic method, and so on. In case of the stereoscopic method, a left view image that is to be viewed by the left eye and a right view image that is to be viewed by the right eye are provided, and each of the left eye and the right eye respectively views the left view image and the right view image through polarized glasses or through a display equipment, thereby enabling the viewer to acknowledge the 3D effect.

DETAILED DESCRIPTION OF THE INVENTION

Technical Objects

A technical object of the present invention is to control a 3D image display so that multiple users can experience diverse 3D image effects.

Additionally, another technical object of the present invention is to control the 3D image display so that not only a single 3D image but also multiple 2D images or multiple 3D images can be displayed, thereby maximizing the usability of the 3D viewing environment.

Technical Solutions

According to an embodiment of the present invention, an image display method includes the steps of recognizing a pair of 3D glasses being connected to an image display apparatus; when multiple pairs of 3D glasses are connected to the image display apparatus, receiving multiple sets of video data, wherein the video data are displayed by using the multiple pairs of 3D glasses; predetermining a frame rate for the multiple sets of video data, thereby allocating a frame section; multiplexing the multiple sets of video data at the predetermined frame rate with respect to the allocated frame section; and frame-sequentially displaying the multiplexed video data.

Additionally, according to another embodiment of the present invention, an image display apparatus includes an IR emitter controller configured to recognize a pair of 3D glasses being connected to an image display apparatus; a video multiplexer configured to receive multiple sets of video data, wherein the video data are displayed by using the multiple pairs of 3D glasses, to predetermine a frame rate for the multiple sets of video data, thereby allocating a frame section, and to multiplex the multiple sets of video data at the predetermined frame rate with respect to the allocated frame section, when multiple pairs of 3D glasses are connected to the image display apparatus; and a display unit configured to frame-sequentially display the multiplexed video data.

Effects of the Invention

According to the present invention, by displaying diverse video data by using a single image display apparatus (or device), the utilization ratio of the image display apparatus may be maximized.

Also, according to the present invention, by adjusting the frame rate of diverse video data and multiplexing the adjusted video data, and by controlling 3D glasses based upon such multiplexing, multiple users may be capable of simultaneously viewing multiple images.

Additionally, according to the present invention, even if the number of video data sets being displayed in accordance with the user's selection (or choice) is varied, the present invention may handle such variation by multiplexing the varied (or changed) number of video data sets and by displaying the respectively multiplexed video data.

Furthermore, according to the present invention, the development and usage of an application using the apparatus enabling multiple users to simultaneously view multiple images may be available. For example, a scenario for diverse applications, such as a game application enabling multiple users to participate and play all at the same time, may be available.

BEST MODE FOR CARRYING OUT THE PRESENT INVENTION

Figure 1:
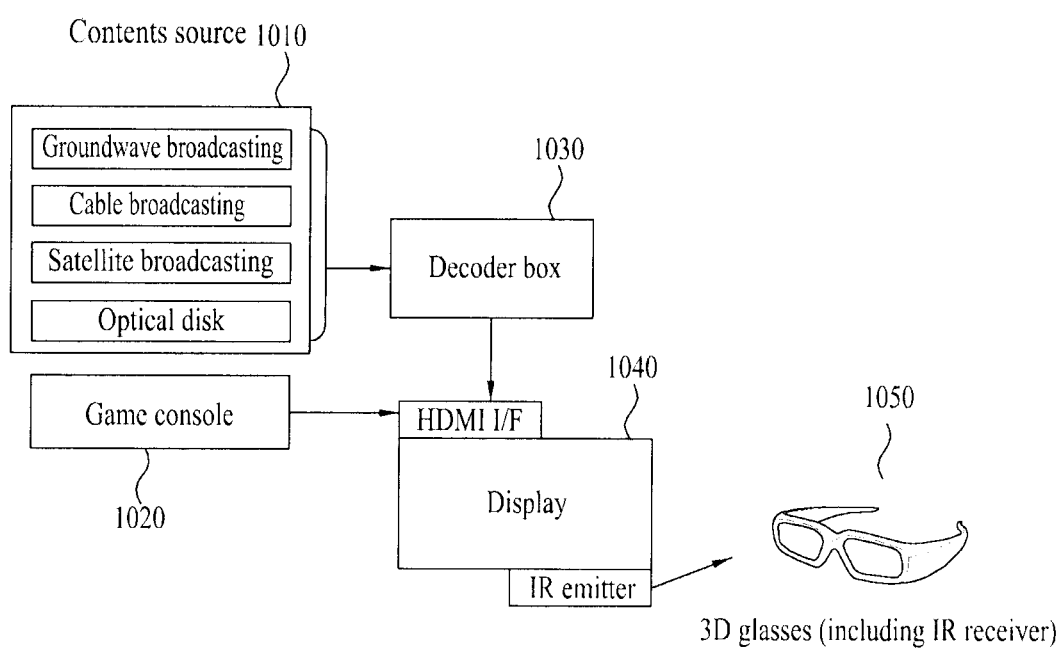
FIG. 1 illustrates an image display apparatus according to an exemplary embodiment of the present invention.

The preferred embodiments of the present invention will now be described in detail with reference to the accompanying drawings and the details given in the accompanying drawings. However, the present invention will not be limited only to the preferred embodiments described herein.

Although the terms used in the present invention are selected from generally known and used terms, some of the terms mentioned in the description of the present invention may be varied by anyone skilled in the art at his or her discretion, according to custom, or due to the advent of new technologies. Also, in some cases, some of the terms mentioned in the description of the present invention have been selected by the applicant at his or her discretion. And, in these cases, the detailed meanings are described in relevant parts of the description presented herein. Therefore, it is required that the terms used in the description of the present invention is understood not simply by the mere naming of the terms used herein but by the actual meaning of each term lying within and, also, based upon the overall content of the description of the present invention.

Hereinafter, a 3D image display apparatus will be described in detail. Herein, the 3D image display apparatus may refer to diverse types of apparatuses, which display 3D images or output 3D image data after receiving 3D contents, such as digital TVs, set-top boxes, PDAs, mobile phones, and so on.

With the commercialization of the broadcasting environment for 3D images, 3D image display apparatuses are being provided to a wide range of users.

3D image presentation methods include a stereoscopic image method, which takes into account two perspectives (or viewpoints), and a multi-view image method, which takes into account three or more perspectives (or viewpoints). Conversely, the related art single view image type may be referred to as a monoscopic method.

A stereoscopic image method uses a left/right pair of images acquired by photographing the same subject with a left-side camera and a right-side camera, wherein both cameras are spaced apart from one another at a predetermined distance. A multi-view image uses a set of at least 3 images acquired by photographing with at least 3 different cameras either spaced apart from one another at predetermined distances or placed at different angles. Hereinafter, although the stereoscopic method will be described according to an embodiment of the present invention, the ideas of the present invention may also be applied to the multi-view method.

Hereinafter, a method for controlling 3D display and 3D glasses so that multiple users can view multiple images at the same time is a 3D display environment will be described in detail.

When a single user views a 3D image, based upon the 3D glasses type, and most particularly, when using a pair of active glasses, the pair of 3D glasses may open/close the left/right lenses so that the user can view the image corresponding to the perspective (or viewpoint) currently being displayed. More specifically, when the 3D display image corresponds to a left view image, the pair of 3D glasses may open the left side lens and may close the right side lens. And, when the 3D display image corresponds to a right view image, the pair of 3D glasses may close the left side lens and may open the right side lens. Thus, the pair of 3D glasses may allow the user to view the image corresponding to the appropriate (or best-fitting) viewpoint.

The present invention proposes a method enabling multiple users to view multiple images by using the above-described 3D image display and operations of the pair of 3D glasses.

First of all, when multiple users respectively use multiple pairs of 3D glasses, a first pair of 3D glasses of a first user (or User 1) may be controlled to allow the respective user to view only the left view image, and a second pair of 3D glasses of a second user (or User 2) may be controlled to allow the respective user to view only the right view image, thereby enabling each of the first user (User 1) and the second user (User 2) to view a different image through a 2D image display. For example, by controlling the 3D glasses so as to allow the first user to view the left view image and to allow the second user to view the right view image, the image display apparatus according to the present invention may respective display different images as a left view image and a right view image, so that the first user and the second user each can view different images at the same time.

Additionally, allocating different time slots for each of the multiple users, the 3D image display may be controlled so that each of the users can view a different 3D image. For example, time slots may be allocated to 4 sections in order to control display and 3D glasses sequences, so that a first time slot and a third time slot can display a left view image and a right view image to a first user, and so that a second time slot and a fourth time slot can display a left view image and a right view image to a second user. Hereinafter, in a video data processing viewpoint, a time slot may also correspond to a frame section (or frame interval). In other words, hereinafter, a time slot may also be referred to as a video frame or a video frame section (or interval).

Hereinafter, a method for controlling a 3D image display apparatus so that the above-described multiple users can simultaneously view multiple images will be described in detail.

Hereinafter, the 3D image display apparatus may also be referred to as a display apparatus or an image display apparatus. Additionally, the term image may also represent an image being displayed on a display screen or video data corresponding to such image. Hereinafter, the term image may also be referred to as a picture.

FIG. 1 illustrates an image display apparatus according to an exemplary embodiment of the present invention.

Referring to FIG. 1, an image display apparatus (1040) includes an HDMI (High-Definition Multimedia Interface) interface (I/F) being connected to an external device and performing data communication, a display, and an IR emitter transmitting IR (Infrared Rays) signals to an external device, such as a pair of 3D glasses (1050). The pair of 3D glasses (1050) includes an IR receiver receiving such IR signals.

The image display apparatus (1040) receives contents that are to be displayed through the HDMI interface. The contents that are to be displayed may correspond to contents decoded from a decoder box (1030) or game contents being received from a game console (1020). The decoder box (1030) receives contents from diverse contents sources (1010), such as groundwave broadcasting, cable broadcasting, satellite broadcasting, optical disk, and so on. Then, the decoder box (1030) may transmit the decoded data to the 3D image display apparatus (1040). According to an embodiment of the present invention, the decoder box (1030) may be included in the 3D image display apparatus. Hereinafter, the game console (1020) may also be referred to as a game player.

When the image display apparatus (1040) receives contents, the image display apparatus (1040) interprets user ID, viewpoint information (presence or absence of left view and right view) of a frame, and so on, which are included in an image frame of the received contents. The 3D image display apparatus (1040) generates glasses ID information corresponding to the user ID, and the 3D image display apparatus (1040) uses the viewpoint information respective to the frame that is to be outputted, so as to generate a control sequence for performing opening/closing operations respective to the left/right views of each pair of glasses.

The 3D image display apparatus (1040) transmits the generated glasses ID and control sequence, and the pair of 3D glasses (1050) receives/interprets the control sequence through the IR receiving unit and then performs opening/closing operations respective to the left side/right side lenses of 3D glasses best-fitting the received/interpreted control sequence. Although FIG. 1 shows a single pair of 3D glasses, when multiple users use multiple pairs of 3D glasses, the pair of 3D glasses of each user may perform opening/closing operations of each lens best-fitting the glasses ID transmitted from the 3D image display apparatus (1040), so as to perform control operations enabling the multiple users to view multiple images.

Figure 2:
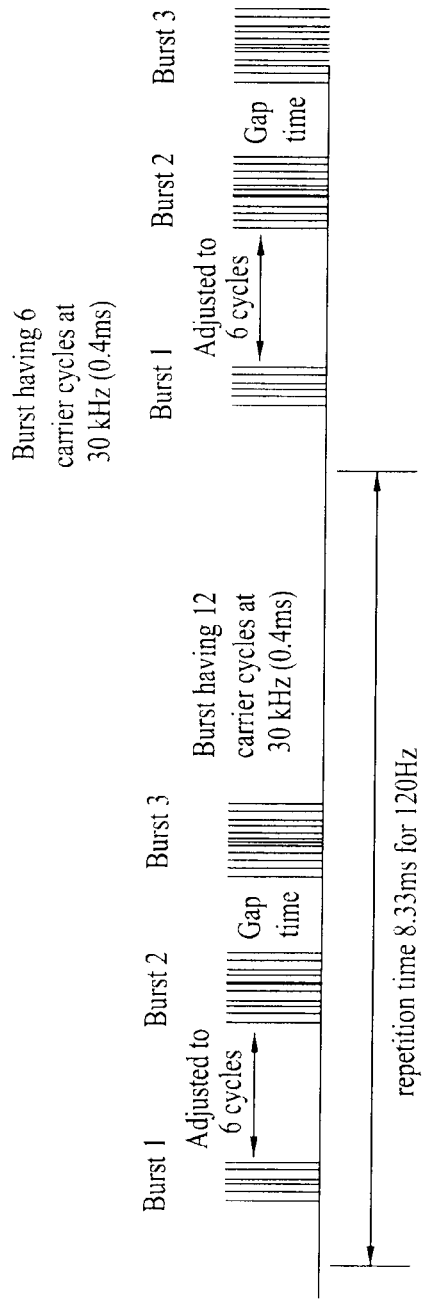
FIG. 2 illustrates a 3D glasses control sequence of the image display apparatus according to the exemplary embodiment of the present invention.

FIG. 2 illustrates a 3D glasses control sequence of the image display apparatus according to the exemplary embodiment of the present invention.

The control sequence of FIG. 2 represents a control sequence being transmitted from an image display apparatus to transmit to one pair of 3D glasses or multiple pairs of 3D glasses.

According to an exemplary embodiment of the present invention, a control sequence for 3D synchronization may have a carrier frequence of 30 kHz, so as to be transmitted. According to an exemplary embodiment of the present invention, a carrier frequency for a remote controller may use 36 kHz to 56 kHz.

According to an exemplary embodiment of the present invention, a wavelength of the control sequence may be equal to 830 nm, and, in this case, the wavelength of the remote controller may be equal to 940 nm.

The pair of 3D glasses uses the IR receiver to receive the control sequence, which is shown in FIG. 2, so as to interpret the received control sequence. The pair of 3D glasses interprets the patterns of the received control sequence, so as to perform operation commands respective to the patterns of the received sequence.

According to an exemplary embodiment of the present invention, the operation commands respective to the patterns of the sequence may be defined as shown below in the following tables.

TABLE 1

| Glasses ID | Burst 1 |
| --- | --- |
| 0 | 3 Cycles |
| 1 | 6 Cycles |
| Both 0 and 1 | 9 Cycles |

TABLE 2

| Command | Burst 2 | Gap Type | Burst 3 |
| --- | --- | --- | --- |
| Open left view | 6 Cycles | 10 Cycles | 6 Cycles |
| Open right view | 6 Cycles | 14 Cycles | 6 Cycles |
| Close left view | 6 Cycles | 18 Cycles | 6 Cycles |
| Close right view | 6 Cycles | 10 Cycles | 12 Cycles |
| Open both views | 6 Cycles | 14 Cycles | 12 Cycles |
| Close both views | 6 Cycles | 18 Cycles | 12 Cycles |

As shown in FIG. 2, in the control sequence, a control pattern having a predetermined length is being repeated at an interval of 8.33 ms. The control pattern of this one section may represent a command for the operation of each pair of 3D glasses.

For example, in the control pattern of each section, the ID for each of the multiple pairs of 3D glasses may be identified as shown in Table 1 based upon the cycle of Burst 1. Table 1 shows a case when 2 pairs of 3D glasses are being used. Depending upon each cycle of Burst 1, when Burst 1 corresponds to 3 cycles, the corresponding control pattern may indicate that the command corresponds to a command for a pair of 3D glasses given an ID of 0. When Burst 1 corresponds to 6 cycles, the corresponding control pattern may indicate that the command corresponds to a command for a pair of 3D glasses given an ID of 1. And, when Burst 1 corresponds to 9 cycles, the corresponding control pattern may indicate that the command corresponds to both the command for a pair of 3D glasses given an ID of 0 and the command for a pair of 3D glasses given an ID of 1.

The exemplary embodiment of the command respective to the control pattern is shown in Table 2. For example, in a control pattern shown in FIG. 2, when Burst 1 corresponds to 3 cycles, when Burst 2 corresponds to 6 cycles, when a gap time corresponds to 18 cycles, and when Burst 3 corresponds to 6 cycles, a pair of 3D glasses given an ID of 0 is being operated. During this control pattern section, the pair of 3D glasses given the ID of 0 closes the left side lens.

More specifically, the 3D image display device control the image display in accordance with the number of pairs of 3D glasses. And, the 3D image display device may also generate and transmit the above-described control sequence, so that each of the multiple users can view a different image by controlling each pair of 3D glasses in accordance with the display of the corresponding image.

Hereinafter, the control of such display and the control of the pair of 3D glasses will be described in more detail.

Figure 3:
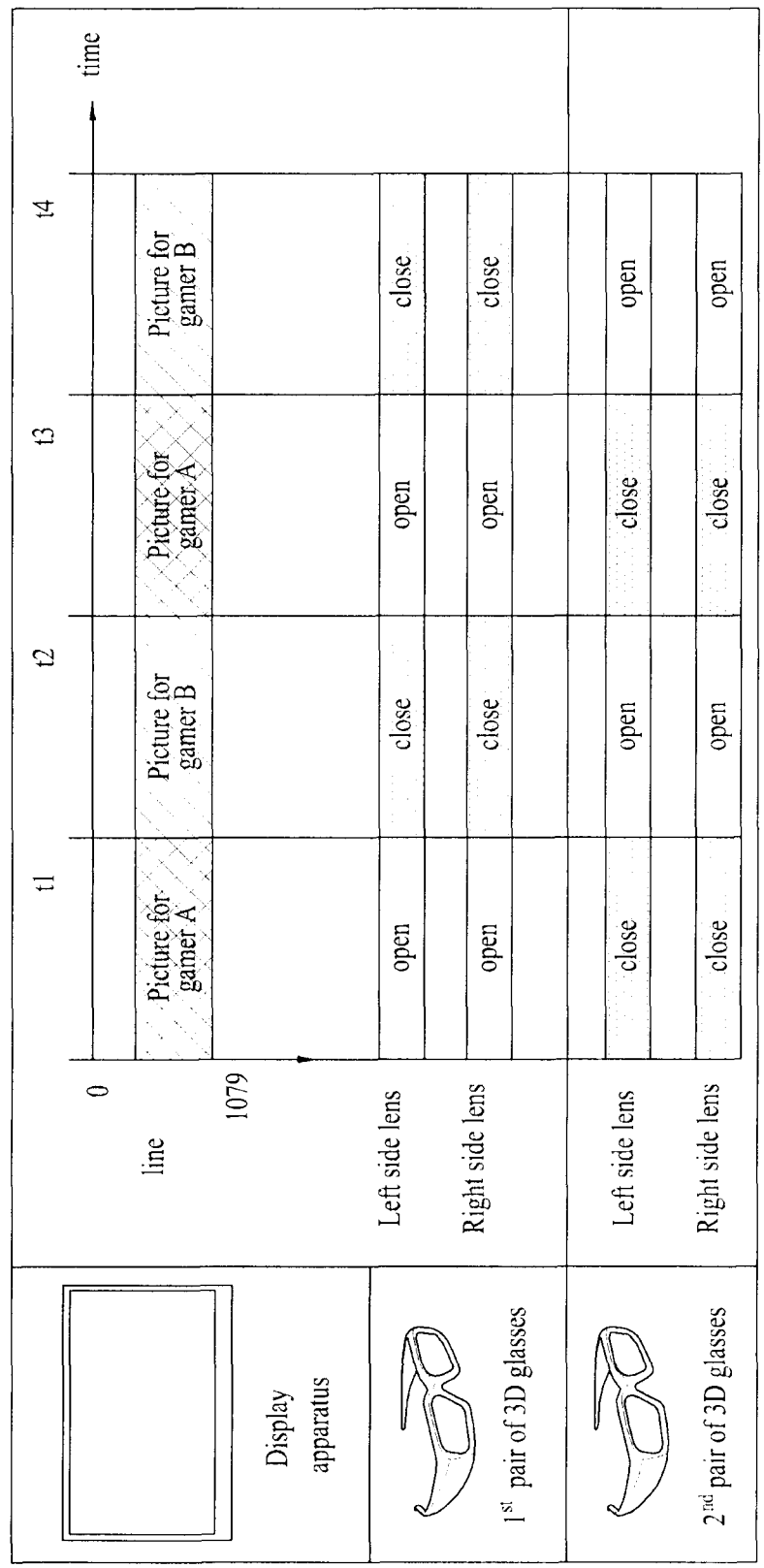
FIG. 3 illustrates a display control method of the image display apparatus according to the exemplary embodiment of the present invention.

FIG. 3 illustrates a display control method of the image display apparatus according to the exemplary embodiment of the present invention.

FIG. 3 illustrates an exemplary embodiment of a method enabling 2 users to each view a different image via 2D display. In the exemplary embodiment shown in FIG. 3, each of the 2 users respectively plays game A and game B.

And, accordingly, the pictures for game A are displayed and provided to the $1^{st}$ user (or User 1), and the pictures for game B are displayed and provided to $2^{nd}$ user (or User 2).

As shown in FIG. 3, the display apparatus displays pictures of the game played by each user to a frame section corresponding to the time slot. More specifically, pictures for game A are displayed in frame sections 0~t1, pictures for game B are displayed in frame sections t1~t2, pictures for game A are displayed in frame sections t2~t3, and pictures for game B are displayed in sections t3~t4. The pictures for game A and the pictures for game B are also alternately and serially displayed in the subsequent frame sections.

Furthermore, the image display apparatus controls multiple pairs of 3D glasses to best-fit such picture display sequence. In other words, the image display apparatus generates and transmits a control sequence so that the $1^{st}$ pair of 3D glasses used by User 1 can open both left and right lenses during the frame sections t0~t1 and frame sections t2~t3, and so that the $1^{st}$ pair of 3D glasses used by User 1 can close both left and right lenses during frame sections t1~t2 and frame sections t3~t4. Accordingly, User 1 is capable of viewing the pictures for game A. Additionally, the image display apparatus generates and transmits a control sequence so that the $2^{nd}$ pair of 3D glasses used by User 2 can close both left and right lenses during the frame sections t0~t1 and frame sections t2~t3, and so that the $2^{nd}$ pair of 3D glasses used by User 2 can open both left and right lenses during frame sections t1~t2 and frame sections t3~t4. Accordingly, User 2 is capable of viewing the pictures for game B.

The exemplary embodiment of such control sequence may be generated as described in FIG. 2. And, the control method shown in the drawing of FIG. 3 may be expressed in the form of a control sequence in each frame section as shown below.

<Command Sequence>
Frame 0:<glassID:0> <open both eyes>, <glassID:1> <close both eyes>
Frame 1:<glassID:0> <close both eyes>, <glassID:1> <open both eyes>
Frame 2:<glassID:0> <open both eyes>, <glassID:1> <close both eyes>
Frame 3:<glassID:0> <close both eyes>, <glassID:1> <open both eyes>

Figure 4:
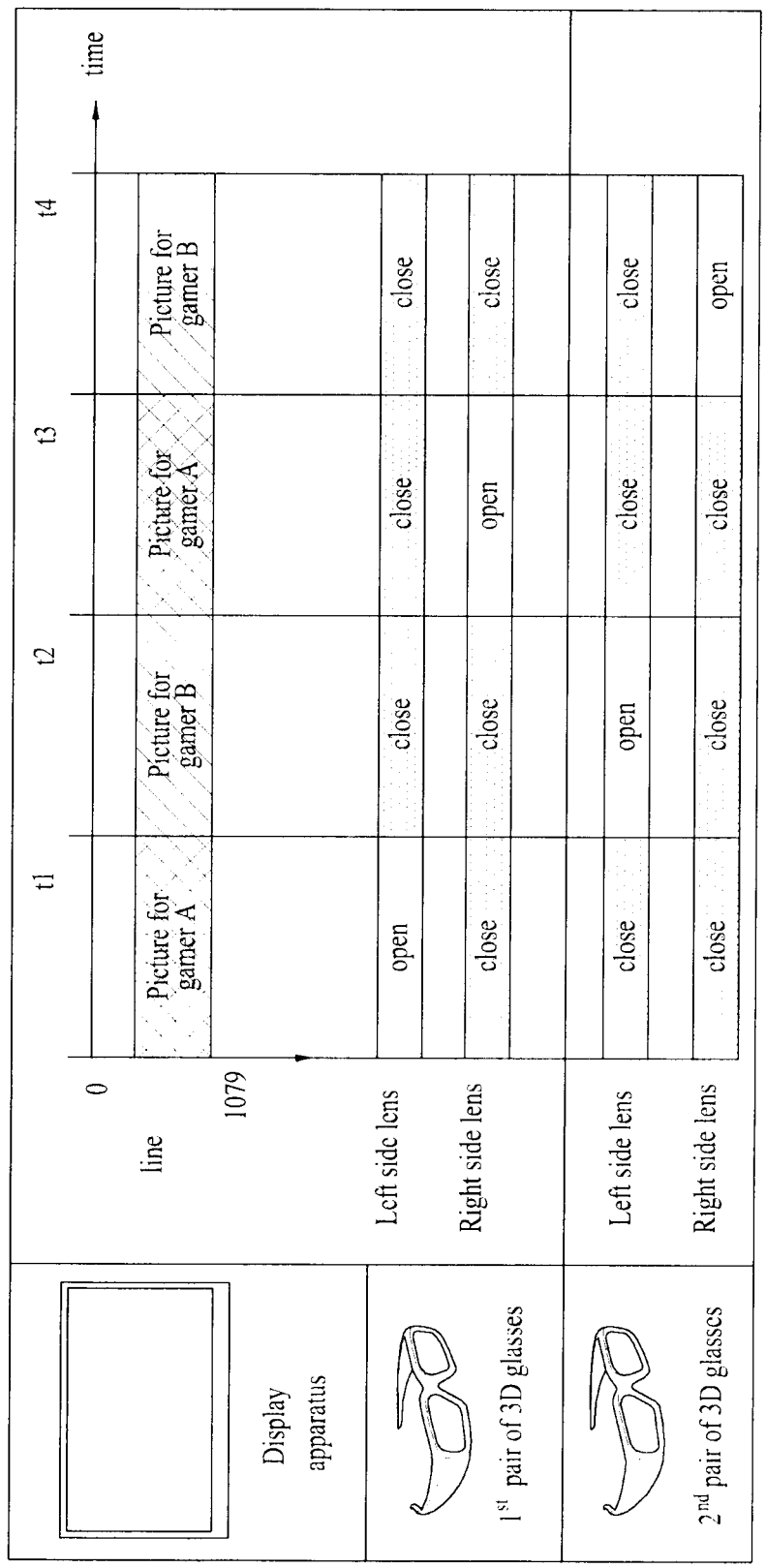
FIG. 4 illustrates a display control method of the image display apparatus according to another exemplary embodiment of the present invention.

FIG. 4 illustrates a display control method of the image display apparatus according to another exemplary embodiment of the present invention.

FIG. 4 illustrates an exemplary embodiment of a method enabling 2 users to each view a different image via 3D display. In the exemplary embodiment shown in FIG. 4, each of the 2 users respectively plays game A and game B. And, accordingly, the pictures for game A are displayed and provided to the $1^{st}$ user (or User 1), and the pictures for game B are displayed and provided to $2^{nd}$ user (or User 2).

As shown in FIG. 4, the display apparatus displays pictures of the game played by each user to a frame section corresponding to the time slot. More specifically, left view pictures for game A are displayed in frame sections 0~t1, left view pictures for game B are displayed in frame sections t1~t2, right view pictures for game A are displayed in frame sections t2~t3, and right view pictures for game B are displayed in sections t3~t4. The left/right view pictures for game A and the left/right view pictures for game B are displayed by the order of frame sections 0~t4.

Furthermore, the image display apparatus controls multiple pairs of 3D glasses to best-fit such picture display sequence. In other words, the image display apparatus generates and transmits a control sequence so that the $1^{st}$ pair of 3D glasses used by User 1 can open the left side lens during the frame sections t0~t1, so that the $1^{st}$ pair of 3D glasses used by User 1 can open the right side lens during frame sections t2~t3, and so that the $1^{st}$ pair of 3D glasses used by User 1 can close both left and right lenses during frame sections t1~t2 and frame sections t3~t4. Accordingly, User 1 is capable of viewing the pictures for game A via 3D display. Additionally, the image display apparatus generates and transmits a control sequence so that the $2^{nd}$ pair of 3D glasses used by User 2 can close both left and right lenses during the frame sections t0~t1 and frame sections t2~t3, so that the $2^{nd}$ pair of 3D glasses used by User 2 can open the left side lens during the frame sections t1~t2, and so that the $2^{nd}$ pair of 3D glasses used by User 2 can open the right side lens during frame sections t3~t4. Accordingly, User 2 is capable of viewing the pictures for game B via 3D display.

The exemplary embodiment of such control sequence may be generated as described in FIG. 2. And, the control method shown in the drawing of FIG. 4 may be expressed in the form of a control sequence in each frame section as shown below.

<Command Sequence>
Frame 0:<glassID:0> <open left eye>, <glassID:0> <close right eye>, <glassID:1> <close both eyes>
Frame 1:<glassID:0> <close both eyes>, <glassID:1> <open left eye>, <glassID:1> <close right eye>
Frame 2:<glassID:0> <close left eye>, <glassID:0> <open right eye>, <glassID:1> <close both eyes>
Frame 3:<glassID:0>, <close both eyes>, <glassID:1> <close left eye>, <glassID:1> <open right eye>

In FIG. 3 and FIG. 4, the multiple images being simultaneously displayed have been described as pictures respective to game A and pictures respective to game B. However, this is merely exemplary, and, therefore, as shown in FIG. 1, in addition to the game images, the multiple images may also include at least one of images of groundwave broadcasting contents, images of cable broadcasting contents, images of satellite broadcasting contents, each being received from multiple sources, and images being outputted from an optical disk, such as blueray disks.

For example, when two images are to be displayed, and when one of the two images corresponds to an image of a groundwave broadcasting program being received via in-band, and when the other one of the two images corresponds to a contents image being received from a blu-ray player, two independent video frames may be mixed and displayed by using the above-described frame-sequential method in frame units. In this case, 2 users may each be capable of simultaneously viewing different contents in Full Resolution through a single display apparatus.

Figure 5:
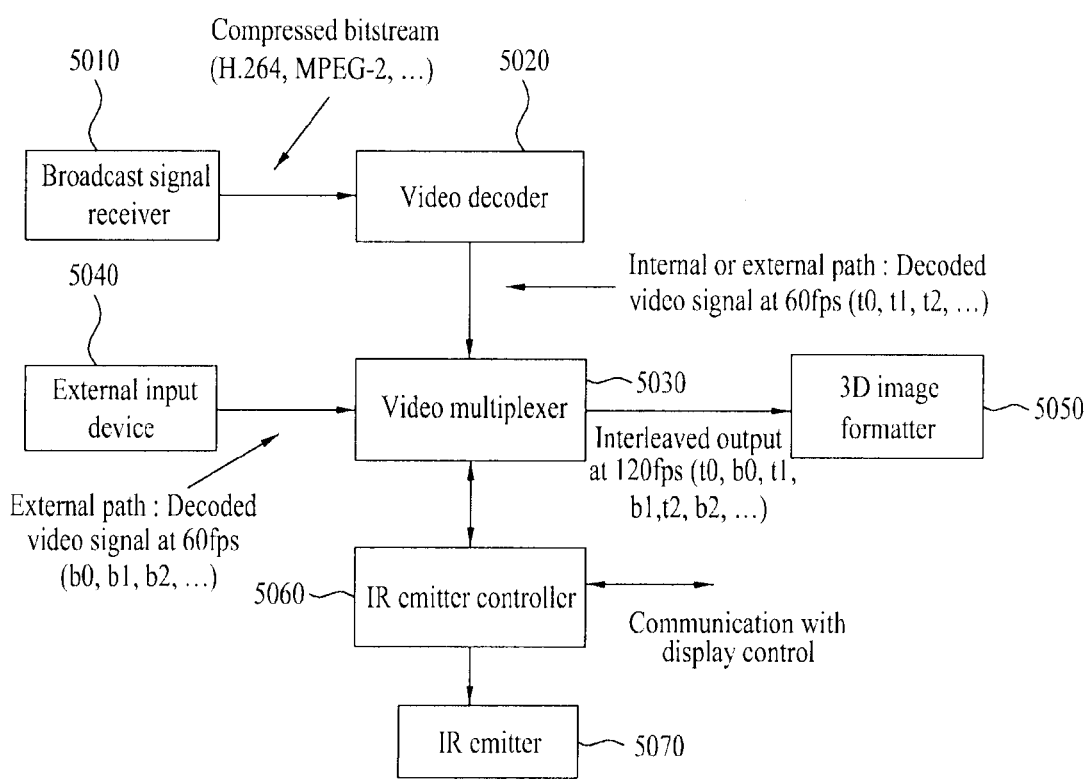
FIG. 5 illustrates an image display apparatus according to another exemplary embodiment of the present invention.

FIG. 5 illustrates a 3D image display apparatus according to another exemplary embodiment of the present invention.

The 3D image display apparatus may include a broadcast signal receiver (5010), a video decoder (5020), a video multiplexer (5030), an external input device (5040), a 3D image formatter (5050), an IR emitter controller (5060), and an IR emitter (5070). And, the operations of each device will hereinafter be described in detail. In FIG. 5, the broadcast signal receiver (5010) and the external input device (5040) may be provided outside of the 3D image display apparatus and may also be connected to the 3D image display apparatus through a communication means such as an HDMI interface.

The broadcast signal receiver (5010) receives and processes broadcast signals, such as groundwave broadcast signals, satellite broadcast signals, cable broadcast signals, and so on, and then outputs video data included in the received and processed broadcast signals. The outputted video data may consist of a compressed video stream configured in an H.264 format, an MPEG-2 format, and so on.

The video decoder (5020) receives and decodes the vide data included in the broadcast signal. For example, the decoded video data being outputted from the video decoder (5020) may include image frames (t0, t1, t2, . . . ) of 60 fps (frames per second).

The external input device (5040) may correspond to a bluray player, a DVD player, or a game player. More specifically, the external input device (5020) outputs video data for outputting display from a path other than that of the broadcast signals. According to an exemplary embodiment of the present invention, the video data being outputted from the external input device may include image frames (b0, b1, b2, . . . ) of 60 fps.

The video multiplexer (5030) multiplexes image frames being included in the multiple sets of video data. In other words, as described above with reference to FIG. 2 to FIG. 4, the video multiplexer frame-sequentially multiplexes the image frames included in the multiple sets of video data in accordance with the display method (2D or 3D) and then outputs the frame-sequentially multiplexed image frames. According to the exemplary embodiment of the present invention, in the example of FIG. 5, the video multiplexer (5030) frame-sequentially multiplexes the image frames (t0, t1, t2, . . . ) being outputted from the video decoder (5020) and the image frames (b0, b1, b2, . . . ) being outputted from the external input device (5040), so as to output image frames (t0, b0, t1, b1, t2, b2, . . . ) of 120 fps. The multiplexing operations respective to the frame rate adjustment will hereinafter be described in detail.

The IR emitter controller (5030) generates a control sequence enabling the 3D glasses to be controlled in accordance with the order of the image frames multiplexed by the video multiplexer (5030). Thereafter, the generated control sequence is transmitted through the IR emitter (5070). The generation of the control sequence performed by the IR emitter controller (5030) has been described above in detail with reference to FIG. 2 to FIG. 4.

The 3D image formatter (5050) formats 3D images so that the image frames multiplexed by the video multiplexer (5030) can be frame-sequentially displayed and, then, outputs the formatted 3D images.

Although it is not shown in FIG. 5, the operations of the video multiplexer (5030) and the 3D image formatter may be controlled by the display controller. In this case, the IR emitter controller (5060) communicates with the display controller so as to generate a control sequence in accordance with the video data being multiplexed by the video multiplexer (5030). Additionally, the image display apparatus includes a display unit, thereby being capable of displaying the multiplexed video data.

Figure 6:
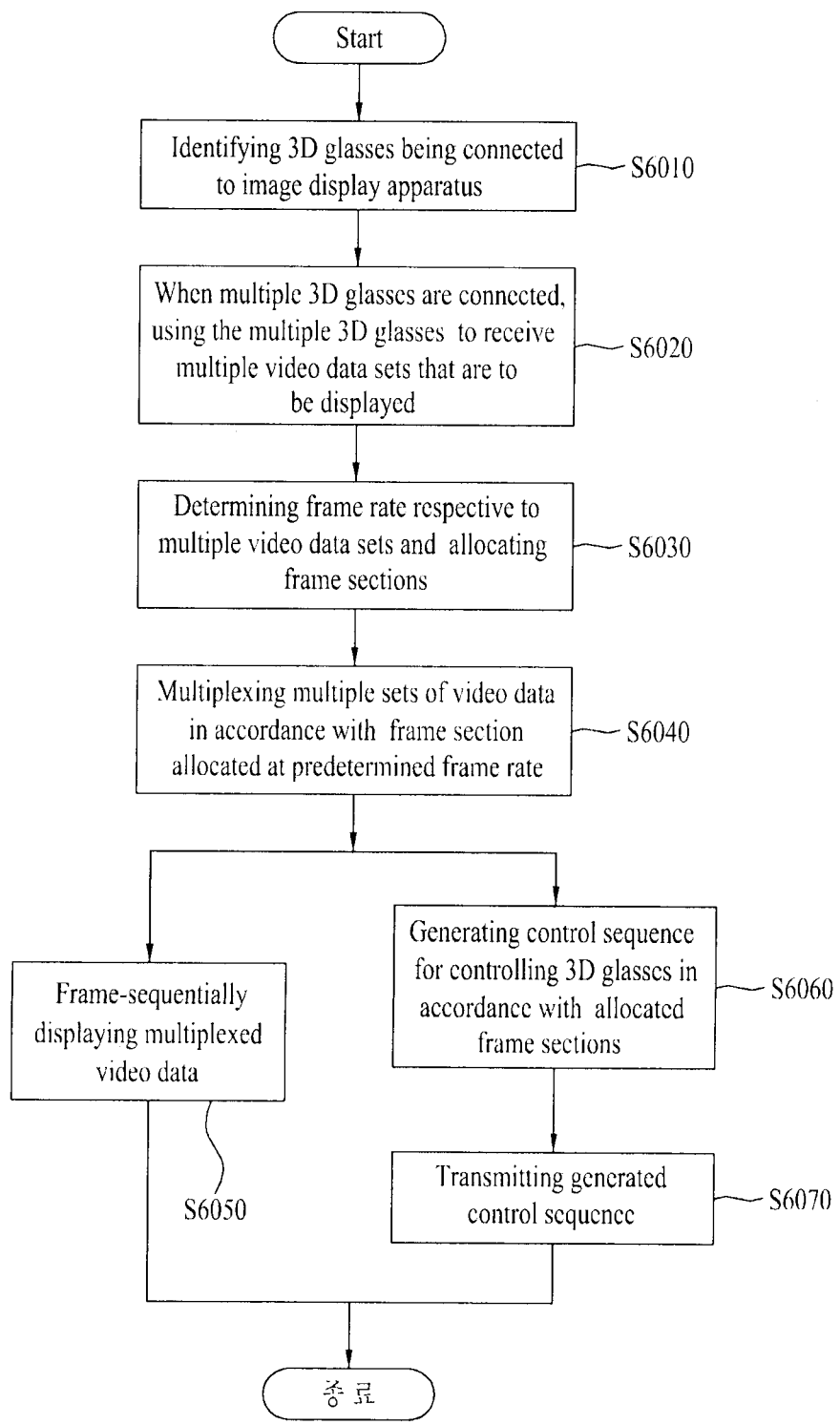
FIG. 6 illustrates an image display method according to an exemplary embodiment of the present invention.

FIG. 6 illustrates an image display method according to an exemplary embodiment of the present invention.

FIG. 6 illustrates an image display method of the image display apparatus shown in FIG. 1 to FIG. 6.

The image display apparatus recognizes (or identifies) a pair of 3D glasses connected to the image display apparatus.

The image display apparatus uses the IR emitter or the IR emitter controller, so as to be capable of identifying (or recognizing) the 3D glasses currently being connected to the image display apparatus. In this case, the image display apparatus transmits a specific control sequence and receives a respective acknowledgement (acknowledg), thereby being capable of determining whether or not one or more pairs of glasses are currently connected to the image display apparatus and determining the number of pairs of 3D glasses being connected to the image display apparatus.

In case multiple pairs of 3D glasses are connected to the image display apparatus, the image display apparatus may receive the multiple sets of video data that are to be displayed by using the multiple pairs of 3D glasses (S6020).

As described above with reference to FIG. 1 to FIG. 4, the image display apparatus may simultaneously display multiple sets of video data. Such multiple sets of video data may receive video data being received through a broadcast signal based upon the source type, video data being received from a game player, and video data being received from an optical disk player. The image display apparatus may display a number of video data sets corresponding to the number of 3D glasses pairs being connected to the image display apparatus, or the image display apparatus may display a smaller number of video data sets. The number of video data sets that are to be displayed may be decided based upon the number of 3D glasses pairs connected to the image display apparatus or based upon the user's input. In case multiple users are viewing multiple video images, the user may use a user input means identical to that of a remote controller, so as to select a video input. The image display apparatus receives a selected number of video data sets from multiple sources.

The image display apparatus determines a frame rate respective to the received multiple sets of video data and allocates frame sections (S6030).

As described with reference to FIG. 2 to FIG. 5, after determining the frame rate, the image display apparatus sequentially allocates frame sections to the multiple sets of video data in accordance with the determined frame rate. For example, when 2 sets of video data are being multiplexed, a frame rate corresponding to 2 times the frame rate of each video data set may be determined, and frame sections may be allocated to each of the video data sets with respect to the determined frame rate.

The number of displayed video data sets may be varied. In this case, the image display apparatus may adjust the frame rate in accordance with the varied number of video data sets, and the image display apparatus may then allocate frame sections in accordance with the adjusted frame rate. For example, the current frame rate may be A fps, the number of sets of the previous video data is equal to N, and the added or decreased number of video data sets may be expressed as +/−n. In this case, the adjusted frame rate A' may be expresses as $A'=A/N*(N+n)$. When the number of video data sets is increased or decreased in accordance with the user input, the image display apparatus may adjust the frame rate by using the equation presented above. The equation shown above corresponds to an equation used in a case when multiple video data sets are being displayed via 2D display. Accordingly, when the added/deleted video data are being displayed via 3D display, an equation such as $A'=A/N*(N\pm 2n)$ may also be used.

The image display apparatus multiplexes the multiple sets of video data with respect to the frame sections allocated to the predetermined frame rate (S6040).

The video data multiplexing process of the image display apparatus has been described above with reference to FIG. 3 to FIG. 4. More specifically, when a frame rate is determined, the image display apparatus frame-sequentially multiplexes video frames being included in the multiple sets of vide data in accordance with the determined frame rate. In the operation for multiplexing the video frames, examples corresponding to the case when the display method is a 2D method and the case when the display method is a 3D method have already been shown and described with reference to FIG. 3 and FIG. 4.

However, in this case, a black frame may be inserted in-between video frames in accordance with the user's input. Herein, a black frame corresponds to a frame displaying a black display screen through which no other image is being displayed. According to the exemplary embodiment of the present invention, when multiple video frames are displayed and provided to multiple users, the shorter the frame section, the longer the afterimage of the previous video frame, which may eventually influence the display of the next video frame. In order to prevent such effect from occurring, when a black frame is inserted before displaying another video frame, the ghost effect (or afterimage effect) caused by a change in the displayed images may be remarkably reduced. Herein, the black frame may be inserted in-between video frames with respect to the number of video data sets. In this case, the black frame may be inserted at a predetermined frame rate, or the black frame may be inserted after adjusting the frame rate to 2 times the initial frame rate.

The image display apparatus frame-sequentially displays the multiplexed video data (S6050).

Although it is not shown in FIG. 5, the image display apparatus displays the video data by using a display means (LCD, LED, projector, and so on) equipped in the image display apparatus.

In case of displaying such multiplexed video data, the 3D glasses should be controlled to best fit the multiplexed video data, so that each of the multiple users can be capable of viewing the respective video data.

Therefore, the image display apparatus generates a control sequence controlling the pair of 3D glasses in accordance with the predetermined frame rate and the frame section allocated to the multiple sets of video data (S6060).

The process of generating a control sequence controlling the 3D glasses is identical to the process described with reference to FIG. 2 to FIG. 4. The image display apparatus generates a control sequence enabling the multiple pairs of 3D glasses to operate with respect to the frame section allocating the video data, thereby allowing the corresponding image to be displayed in the allocated frame section. In this case, the image display apparatus assigns an ID to each of the recognized (or identified) pair of 3D glasses, and by generating/transmitting a control sequence with respect to the corresponding ID to each pair of 3D glasses, each pair of 3D glasses may be controlled.

Additionally, the image display apparatus transmits the generated control sequence (S6070).

The process of generating and transmitting the control sequence is performed to control multiple pairs of 3D glasses to best fit the synchronization between the multiple pairs of 3D glasses.

The operation of the display apparatus in accordance with the variations made by the user will hereinafter be described in more detail.

When multiple users view a single set of video data through 3D display, the video data bypass the multiplexer, and the IR emitter controller may transmit the same control sequence to multiple pairs of 3D glasses.

When multiple users view multiple sets of video data, the multiple sets of video data may be multiplexed as 2D or 3D data and may then be displayed.

In case of the 2D display, as described above with reference to FIG. 3, the frame rate may be increased in proportion to the number of video data sets being viewed by the users, so that the video data can be multiplexed at the corresponding frame interval. For example, in case the frame rate prior to the multiplexing process is A fps, and in case N number of video data sets are currently being simultaneously viewed by multiple users, the frame rate may be increased to A*N fps, and the multiple sets of video data may be sequentially multiplexed. Depending upon the multiplexed frame sections, the display apparatus generates and transmits a control sequence so that the 3D glasses of the corresponding user can be open during the frame section when the corresponding user wishes to view the respective video data, and so that the 3D glasses of the corresponding user can be closed during the frame sections when other users view the video data. When 2 users view 2 different sets of video data at the same time, with respect to the 3D video display, the first set of video data may be displayed as the left view image, and the second set of video data may be displayed as the right view image. In this case, even when a pair of passive type 3D glasses is used, 2 different sets of video data may be viewed by different users at the same time. If the number of users decreases, or if the number of video data sets decreases by having some of the multiple users view the same video data set, the frame rate may vary accordingly. When the current frame rate viewed by N number of users corresponds to A*N fps, and the number of video data sets being added (or increased) or decreased is equal to n, the varied (or changed) frame rate may correspond to (A*N)/(N)*(N±n) fps.

In case of the 3D display, as described above with reference to FIG. 4, by increasing the frame rate as much as the number of video data sets that are currently being viewed at the same time, the video data may be multiplexed at the corresponding frame interval. For example, in case the video data prior to being multiplexed correspond to 2D video data, and when the frame rate corresponds to A fps, if the video data prior to being multiplexed correspond to 3D video data, since left/right view images should both be displayed, the corresponding frame rate may be equal to 2*A fps. When the number of video data sets simultaneously being viewed by multiple users is equal to N, the frame rate may be increased to 2A*N fps, and the multiple sets of video data may be sequentially multiplexed. Depending upon the multiplexed frame sections, the display apparatus generates and transmits a control sequence so that the 3D glasses of the corresponding user can be open with respect to the left/right views during the frame section when the corresponding user wishes to view the respective video data, and so that the 3D glasses of the corresponding user can be closed during the frame sections when other users view the video data.

Figure 7:
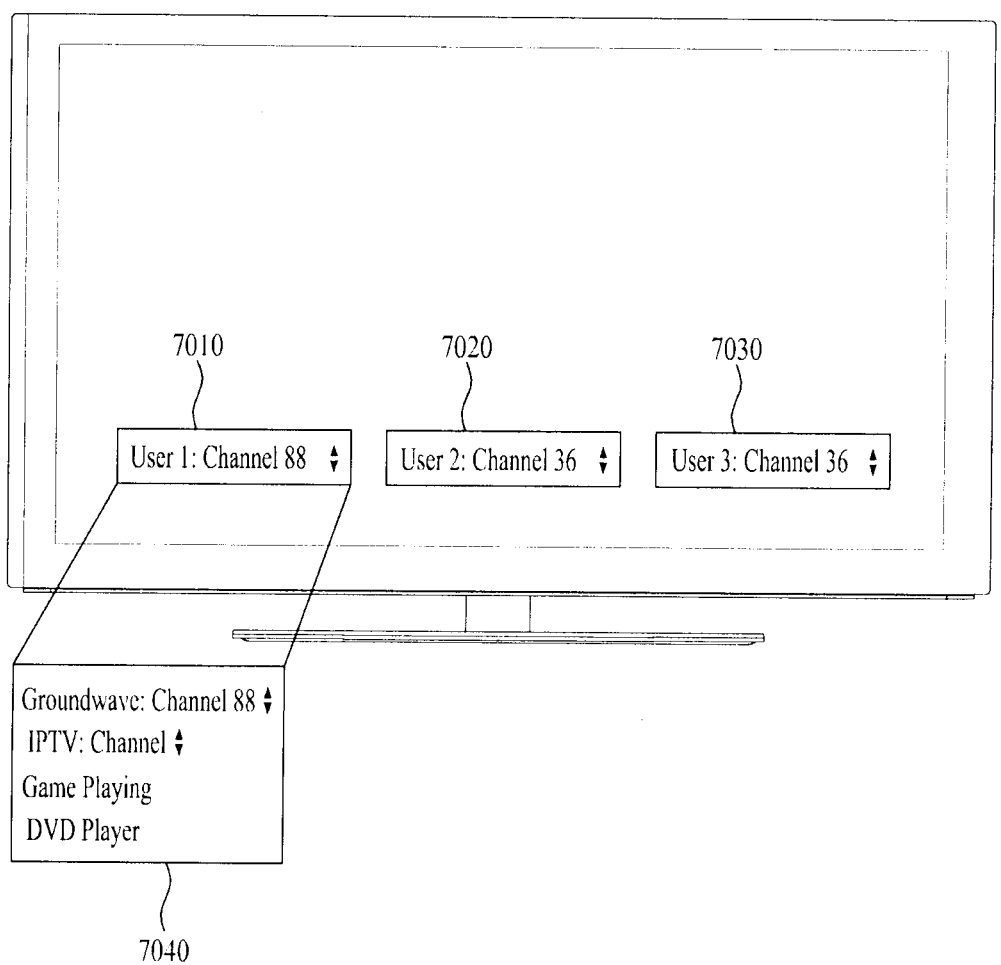
FIG. 7 illustrates a UI (User Interface) of an image display apparatus according to an exemplary embodiment of the present invention.

FIG. 7 illustrates a UI (User Interface) of an image display apparatus according to an exemplary embodiment of the present invention.

As described above, when multiple users view multiple video data sets at the same time, the image display apparatus may provide a UI respective to such operations. Most particularly, when viewing multiple video data sets at the same time, a channel or video source may be varied (or changed) for each user.

FIG. 7 corresponds to a case when 3 users view video data at the same time. More specifically, FIG. 7 shows an example when User 1 is viewing Channel 88, when User 2 and User 3 are viewing Channel 36. At this point, the image display apparatus may provide UIs (7010-7030) indicating the video source viewed by each viewer, as shown in FIG. 7. Additionally, a UI (7040) selecting a video source, when a respective UI is selected, may be additionally provided. Such UIs may remain hidden and not shown on the display screen while the video data image is being displayed. Then, the UIs may be displayed on the display screen, when activated in accordance with the user's input.

Furthermore, since only the corresponding user is required to selected the desired video source, multiplexing may be performed so that the UI (7010) can be displayed only on the display screen viewed by User 1, and so that the UI (7020, 7030) can be displayed only on the display screens respectively viewed by User 2 and User 3. More specifically, the display apparatus may multiplex and display the UI (7010) in the video frame section displayed and provided to User 1, and the display apparatus may multiplex and display the UIs (7020, 7030) in the video frame sections being respectively displayed and provided to User 2 and User 3. When a user is newly added, a new UI similar to the UIs (7010-7030) of FIG. 7 may also be added. And, when the number of users is decreased, UIs may be displayed only to the remaining users.

MODE FOR CARRYING OUT THE PRESENT INVENTION

As described above, the related details have been described in the best mode for carrying out the present invention.

INDUSTRIAL APPLICABILITY

As described above, the present invention may be fully or partially applied to the digital broadcasting system.

What is claimed is:

1. A method of processing a broadcast signal for displaying multi view in a display panel of a receiver, the method comprising:
receiving the broadcast signal including a first service and a second service, wherein the first service includes first images for displaying video factors of the first service and the second service includes second images for displaying video factors of the second service;
multiplexing multi view video data in which images of the first and second images are multiplexed alternately at a certain frequency in a time domain;
encoding a control sequence for controlling open/close motion of each lens of first viewing eyeglasses for the first service and second viewing eyeglasses for the second service;
transmitting the encoded control sequence to the first and second viewing eyeglasses;
displaying the multi view using the multiplexed multi view video data;
receiving a channel control signal from at least one of the first and second viewing eyeglasses; and
controlling a channel change for the at least one of the first and second viewing eyeglasses based on the received channel control signal,
wherein the multiplexed multi view video data includes a black frame between the first image and the second image, and
wherein a user interface (UI) of the channel change for the first viewing eyeglasses is only displayed with the first images and a UI of the channel change for the second viewing eyeglasses is only displayed with the second images.

2. The method of claim 1,
wherein the control sequence include viewing eyeglasses identification information specifying a viewing eyeglasses to which information in the control sequence is applied.

3. The method of claim 2,
wherein the viewing eyeglasses identification information is signaled by repetition patterns of the control sequence.

4. The method of claim 1, further comprising:
displaying an On Screen Display (OSD) for channel controlling based on the received channel control signal.

5. An apparatus of processing a broadcast signal for displaying multi view in a display panel of a receiver, the apparatus comprising:
a receiving unit that receives the broadcast signal including a first service and a second service, wherein the first service includes first images for displaying video factors of the first service and the second service includes second images for displaying video factors of the second service;
a video multiplexer that multiplexes multi view video data in which images of the first and second images are multiplexed alternately at a certain frequency in a time domain;
an encoding unit that encodes a control sequence for controlling open/close motion of each lens of first viewing eyeglasses for the first service and second viewing eyeglasses for the second service;
an emitter that transmits the encoded control sequence to the first and second viewing eyeglasses;
a display unit that displays the multi view using the multiplexed multi view video data;
an emitter controller that receives a channel control signal from at least one of the first and second viewing eyeglasses; and
a display controller that controls a channel change for the at least one of the first and second viewing eyeglasses based on the received channel control signal,
wherein the multiplexed mufti view video data includes a black frame between the first image and the second image, and
wherein a user interface (UI) of the channel change for the first viewing eyeglasses is only displayed with the first images and a UI of the channel change for the second viewing eyeglasses is only display with the second images.

6. The apparatus of claim 5,
wherein the control sequence include viewing eyeglasses identification information specifying a viewing eyeglasses to which information in the control sequence is applied.

7. The apparatus of claim 6,
wherein the viewing eyeglasses identification information is signaled by repetition patterns of the control sequence.

8. The apparatus of claim 5, wherein the display controller is further configured to:
control displaying an On Screen Display (OSD) for channel controlling based on the received channel control signal.

* * * * *